(12) United States Patent
Uenishi et al.

(10) Patent No.: US 7,081,430 B2
(45) Date of Patent: Jul. 25, 2006

(54) EXHAUST GAS PURIFYING CATALYST

(75) Inventors: Mari Uenishi, Osaka (JP); Isao Tan, Osaka (JP); Hirohisa Tanaka, Osaka (JP)

(73) Assignee: Daihatsu Motor Co., Ltd., Ikeda (JP)

( * ) Notice: Subject to any disclaimer, the term of this patent is extended or adjusted under 35 U.S.C. 154(b) by 189 days.

(21) Appl. No.: 10/481,572

(22) PCT Filed: Jun. 18, 2002

(86) PCT No.: PCT/JP02/06076

§ 371 (c)(1),
(2), (4) Date: Dec. 22, 2003

(87) PCT Pub. No.: WO03/000388

PCT Pub. Date: Jan. 3, 2003

(65) Prior Publication Data

US 2004/0235651 A1    Nov. 25, 2004

(30) Foreign Application Priority Data

Jun. 26, 2001    (JP)    ................ 2001-193492

(51) Int. Cl.
*B01J 23/00*    (2006.01)
*B01J 23/42*    (2006.01)
*B01J 23/56*    (2006.01)
*B01J 20/00*    (2006.01)
*B01J 21/00*    (2006.01)

(52) U.S. Cl. ............ 502/327; 502/304; 502/332; 502/333; 502/334; 502/339; 502/349; 502/355; 502/415; 502/439; 502/527.12; 502/527.13

(58) Field of Classification Search ........ 502/302–304, 502/327, 328, 332–334, 339, 349, 355, 415, 502/439, 527.12, 527.13
See application file for complete search history.

(56) References Cited

U.S. PATENT DOCUMENTS

| | | | | |
|---|---|---|---|---|
| 5,015,617 A | * | 5/1991 | Ohata et al. | 502/304 |
| 5,057,483 A | * | 10/1991 | Wan | 502/304 |
| 5,130,109 A | * | 7/1992 | Wan | 423/213.2 |
| 5,254,519 A | * | 10/1993 | Wan et al. | 502/252 |
| 5,260,249 A | * | 11/1993 | Shiraishi et al. | 502/304 |
| 5,294,421 A | * | 3/1994 | Muraki et al. | 423/239.1 |
| 5,837,642 A | | 11/1998 | Yamamoto et al. | |
| 5,945,369 A | * | 8/1999 | Kimura et al. | 502/304 |
| 5,948,723 A | | 9/1999 | Sung | |
| 6,150,288 A | * | 11/2000 | Suzuki et al. | 501/105 |
| 6,261,989 B1 | * | 7/2001 | Tanaka et al. | 502/217 |
| 6,306,794 B1 | * | 10/2001 | Suzuki et al. | 502/304 |
| 6,335,305 B1 | * | 1/2002 | Suzuki et al. | 502/325 |
| 6,387,338 B1 | * | 5/2002 | Anatoly et al. | 423/239.1 |

(Continued)

FOREIGN PATENT DOCUMENTS

EP    1020216 A    7/2000

(Continued)

*Primary Examiner*—Cam N. Nguyen
(74) *Attorney, Agent, or Firm*—Jean C. Edwards, Esq.; Akerman Senterfitt

(57) ABSTRACT

An exhaust gas purifying catalyst that provides the excellent low-temperature activity and also develops the good catalytic activity of rhodium to produce a good purifying performance economically. The exhaust gas purifying catalyst comprises an alumina on which rhodium and platinum are previously supported; a zirconium complex oxide on which rhodium and platinum are previously supported; and a cerium complex oxide on which platinum is previously supported.

6 Claims, 1 Drawing Sheet

Endurance Test Condition (1 cycle)

U.S. PATENT DOCUMENTS

| | | | |
|---|---|---|---|
| 6,464,946 B1 * | 10/2002 | Yamada et al. | 422/177 |
| 6,468,941 B1 * | 10/2002 | Bortun et al. | 502/300 |
| 6,492,297 B1 * | 12/2002 | Sung | 502/304 |
| 6,555,081 B1 * | 4/2003 | Hori et al. | 423/239.1 |
| 6,576,200 B1 * | 6/2003 | Yamamoto et al. | 422/177 |
| 6,602,479 B1 * | 8/2003 | Taniguchi et al. | 423/239.1 |
| 6,620,762 B1 * | 9/2003 | Tan et al. | 502/304 |
| 6,808,687 B1 * | 10/2004 | Uenishi et al. | 422/177 |
| 6,846,466 B1 * | 1/2005 | Matsumoto et al. | 422/180 |
| 6,864,214 B1 * | 3/2005 | Uenishi et al. | 502/304 |
| 6,881,384 B1 * | 4/2005 | Uenishi et al. | 422/177 |

FOREIGN PATENT DOCUMENTS

JP    HEI 10-277389    10/1998

* cited by examiner

Cyclic timing(Sec.)
Endurance Test Condition (1 cycle)

EXHAUST GAS PURIFYING CATALYST

This application is a 35 U.S.C. 371 National Stage entry of PCT/JP02/06076, filed Jun. 18, 2002, which claims priority from Japanese Patent Application No. 2001-193492, filed Jun. 26, 2001, the contents of which are herein incorporated by reference to the extent allowed by law.

TECHNICAL FIELD

The present invention relates to an exhaust gas purifying catalyst for effectively purifying carbon monoxides (CO), hydrocarbons (HC) and nitrogen oxides (NOx) contained in exhaust gas from an automotive engine.

BACKGROUND ART

Three-way catalysts for simultaneously purifying carbon monoxides (CO), hydrocarbons (HC) and nitrogen oxides ($NO_x$) contained in the exhaust gas usually support noble metals, such as platinum, rhodium and palladium, and are now in wide use as exhaust gas purifying catalysts. Of these noble metals supported in the exhaust gas purifying catalysts, rhodium exhibits excellent activity for both oxidation and reduction and develops an excellent effect in purification of $NO_x$ in particular. For this reason, a variety of proposed exhaust gas purifying catalysts employ rhodium as their essential component and support platinum or palladium in combination with rhodium.

In the meantime, rhodium is expensive and there has been a strong industrial desire to produce an exhaust gas purifying catalyst that requires a smallest possible quantity of rhodium for effectively developing the equivalent effect.

Turbocharged engines and light load vehicles are low in exhaust gas temperature and, accordingly, it is necessary for those engines and vehicles to effectively develop the activity of the exhaust gas purifying catalyst even in low temperature.

It is an object of the present invention to provide an exhaust gas purifying catalyst that provides the excellent low-temperature activity and develops the good catalytic activity of rhodium to produce an excellent purifying performance economically.

SUMMARY OF THE INVENTION

The present invention provides a novel exhaust gas purifying catalyst comprising an alumina on which rhodium and platinum are previously supported; a zirconium complex oxide on which rhodium and platinum are previously supported; and a cerium complex oxide on which platinum is previously supported.

It is preferable that in the exhaust gas purifying catalyst of the present invention, the zirconium complex oxide comprises zirconium and cerium in the proportion of the zirconium content being more than the cerium content; and wherein the cerium complex oxide comprises cerium and zirconium in the proportion of the cerium content being more than the zirconium content.

Also, it is preferable that in the exhaust purifying catalyst of the present invention, the zirconium complex oxide is a heat-resisting oxide expressed by the following general formula (1):

$$Zr_{1-(a+b)}Ce_aN_bO_{2-c} \quad (1)$$

(In the formula, N represents alkaline earth metal or rare earth metal, c represents oxygen vacancy, a represents a proportion of atom of 0.10–0.35, b represents a proportion of atom of 0–0.20, and 1–(a+b) represents a proportion of atom of 0.45–0.90), and the cerium complex oxide is a heat-resisting oxide expressed by the following general formula (2):

$$Ce_{1-(x+y)}Zr_xM_yO_{2-z} \quad (2)$$

(In the formula, M represents alkaline earth metal or rare earth metal, z represents oxygen vacancy, x represents a proportion of atom of 0.20–0.70, y represents a proportion of atom of 0–0.20, and 1–(x+y) represents a proportion of atom of 0.10–0.80).

Preferably, the exhaust gas purifying catalyst of the present invention is presented in the form of an outermost layer of multi-coating layers formed on a catalyst carrier. In addition, it is preferable that alumina on which palladium is supported is contained in at least one layer of the multi-coating layers, except the outermost layer. Further, it is preferable that rhodium is not contained in a layer containing alumina on which palladium is supported.

The exhaust gas purifying catalyst of the present invention exhibits an excellent activity for both oxidation and reduction and provides a particularly excellent low-temperature activity, and it also requires only a small quantity of rhodium supported for developing its excellent effect in purification of NOx, and also produces an excellent purifying performance economically even in endurance running at high temperature. Accordingly, the exhaust gas purifying catalyst of the present invention is suitably applicable to turbocharged engines, light load automotive vehicles and the like.

DETAILED DESCRIPTION OF THE INVENTION

Figure 1:
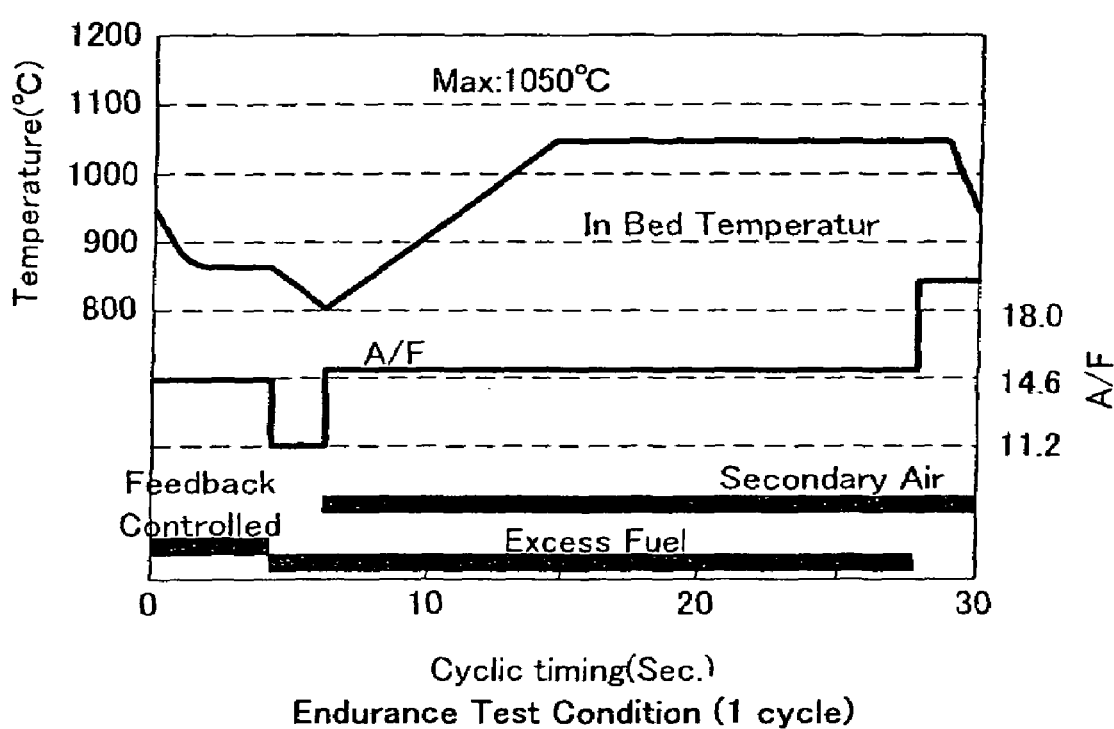
FIG. 1 is a time chart showing a process in one cycle of a 1,050° C. endurance test.

An exhaust gas purifying catalyst of the present invention comprises alumina on which rhodium and platinum are previously supported, a zirconium complex oxide on which rhodium and platinum are previously supported and a cerium complex oxide on which platinum is previously supported.

A known γ-alumina, which is generally used as alumina catalyst, is typically used as the alumina ($Al_2O_3$).

The zirconium complex oxide is a complex oxide comprising zirconium and cerium in the proportion of the zirconium content being more than the cerium content, and preferably used as the zirconium complex oxide is the heat-resisting oxide expressed by the following general formula (1):

$$Zr_{1-(a+b)}Ce_aN_bO_{2-c} \quad (1)$$

(In the formula, N represents alkaline earth metal or rare earth metal, c represents oxygen vacancy, a represents a proportion of atom of 0.10–0.35, b represents a proportion of atom of 0–0.20, and 1–(a+b) represents a proportion of atom of 0.45–0.90).

The alkaline earth metals represented by N include, for example, Be (beryllium), Mg (magnesium), Ca (calcium), Sr (strontium), Ba (barium), and Ra (radium). Mg, Ca, Sr and Ba can be cited as the preferable alkaline earth metal. The rare earth metals represented by N include, for example, Y (yttrium), Sc (scandium), La (lanthanum), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium) and Lu (lutetium), Y, Sc, La, Pr and Nd can be cited as the preferable rare earth metal. These alkaline earth metals or the rare earth metals may be used in single or in combination of two or more.

The proportion of atom of N represented by b is in the range of 0–0.20, which means that no N is contained as the component of heat-resisting oxide or not more than 0.20 of N is contained, if any. When the proportion of atom of N exceeds 0.20, the specific surface area may reduce.

The proportion of atom of cerium (Ce) represented by a is in the range of 0.10–0.35. When the proportion of atom of Ce is less than 0.10, the specific surface area may reduce.

Consequently, the proportion of atom of zirconium (Zr) represented by 1−(a+b) is preferably in the range of 0.45–0.90. When this range is not fulfilled, an intended specific surface area and an intended heat resisting property may not be provided. Further preferably, the proportion of atom of Zr is in the range of 0.65–0.90.

c represents oxygen vacancy, which means a proportion of vacancy formed in a fluorite crystal lattice usually formed via the oxides of Zr, Ce and N.

This zirconium complex oxide can be produced in a known method. To cite an instance, powder of cerium oxide is added with water to form slurry, first. Then, an aqueous solution in which zirconium salt and alkali earth metal salt and/or rare earth metal salt are mixed at a prescribed stoichiometric ratio is added to the slurry and fully stirred. Then, the mixture is oxidized.

The powder of cerium oxide of large specific surface area should preferably be used to provide an increased oxygen storage capacity, though a commercially available powder of cerium oxide can be used. The slurry is formed by adding about 10–50 parts by weight of water per part by weight of powder of cerium oxide.

Salts of the zirconium salt and alkaline earth metal salt and/or rare earth metal salt include, for example, inorganic salts, such as sulfate, nitrate, hydrochloride and phosphate, and organic acid salts, such as acetate and oxalate. Nitrate can be cited as the preferable one. The zirconium salt and the alkaline earth metal salt and/or the rare earth metal salt are dissolved in water in a proportion of 1 part by weight of each to 0.1–10 parts by weight of water so that they comes to be within the range of the above-mentioned specific proportion of atom at the prescribed stoichiometric ratio, to thereby produce mixed aqueous solution.

After the mixed aqueous solution is added to the slurry mentioned above and fully mixed by stirring, the mixture is oxidized. The oxidization process can be performed as follows. First, the mixture is dried under reduced pressure by use of a vacuum dryer, preferably at about 50–200° C. for about 1–48 hours, to thereby produce the dried material. Then, the dried material is baked at about 350–1,000° C., or preferably about 400–700° C., for about 1–12 hours, or preferably about 2–4 hours. Preferably, in the baking procedure, at least a part of the heat-resisting oxide is allowed to turn into a solid solution, to improve the heat-resisting property of the heat-resisting oxide. Desirable baking conditions for forming the solid solution are properly determined, depending on the composition of the heat-resisting oxide and the proportion thereof.

The zirconium complex oxide can also be obtained in the following method as well. First, a salt solution containing zirconium, cerium and alkaline earth metal and/or rare earth metal is prepared in such a manner as to establish a prescribed stoichiometric ratio. Then an aqueous alkaline solution is added in the solution, to coprecipitate the salts including zirconium, cerium and alkaline earth metal and/or rare earth metal. Then, the coprecipitated product is oxidized. In this method, the salts illustrated above can be cited as the salts to be used. The aqueous alkaline solutions that can properly be used include, for example, known buffer, in addition to aqueous solution of salts of alkali metals, such as sodium, potassium and ammonia. Preferably, the aqueous alkaline solution is so prepared that after the addition of the aqueous alkali solution, the solution can have a pH of about 8–11. The oxidation process identical to the process mentioned above can be taken after the coprecipitated product is filtrated and washed.

Further, the zirconium complex oxide can be obtained in the following method. First, a mixed alkoxide solution including zirconium, cerium and alkaline earth metal and/or rare earth metal is prepared in such a manner as to establish a prescribed stoichiometric ratio. Then deionized water is added in the mixed alkoxide solution to cause coprecipitation or hydrolysis. Then, the coprecipitated product or the hydrolyzed product is oxidized. In this method, the mixed alkoxide solution can be prepared by mixing the alcoholates of zirconium, cerium and alkaline earth metal and/or rare earth metal in an organic solvent such as toluene and xylene. The alkoxides to form the alcoholates include methoxide, ethoxide, propoxide, butoxide and alkoxyalkolate thereof such as ethoxyethylate or methoxypropylate. The oxidation process identical to that mentioned above can be taken after the coprecipitated product or the hydrolyzed product is filtrated and washed.

The cerium complex oxide is a complex oxide comprising cerium and zirconium in the proportion of a cerium content being more than a zirconium content, and preferably used as the cerium complex oxide is the heat-resisting oxide expressed by the following general formula (2):

$$Ce_{1-(x+y)}Zr_xM_yO_{2-z} \qquad (2)$$

(In the formula, M represents alkaline earth metal or rare earth metal, z represents oxygen vacancy, x represents a proportion of atom of 0.20–0.70, y represents a proportion of atom of 0–0.20, and 1−(x+y) represents a proportion of atom of 0.10–0.80).

The alkaline earth metals or rare earth metals represented by M include the same as those mentioned above. Mg, Ca, Sr and Ba can be cited as the preferable alkaline earth metal. Y, Sc, La, Pr and Nd can be cited as the preferable rare earth metal. These alkaline earth metals or the rare earth metals may be used in single or in combination or two or more.

The proportion of atom of M represented by y is in the range of 0–0.20, which means that no M is contained as the component of heat-resisting oxide or not more than 0.20 of M is contained, if any.

The proportion of atom of Zr represented by x is in the range of 0.20–0.70. Deterioration of the heat resisting property may be caused when the proportion of atom of Zr is less than 0.20. On the other hand, deterioration of oxygen storage capacity may be caused due to the lack of Ce when the proportion of atom of Zr is more than 0.70.

Consequently, the proportion of atom of Ce represented by 1−(x+y) is in the range of 0.10 to 0.80. Further preferably, the proportion of atom of Ce is in the range of 0.35–0.70.

Z represents oxygen vacancy, which means a proportion of vacancy formed in a fluorite crystal lattice usually formed via the oxides of Ce, Zr and M.

This cerium complex oxide can be produced in a known method using the same process as that mentioned above.

In the exhaust gas purifying catalyst of the present invention, rhodium and platinum are previously supported on alumina with both coexisting with each other. The support of rhodium and platinum on alumina can allow the activity of rhodium to develop effectively from low temperature.

The method of allowing rhodium and platinum to be supported on alumina is not limited to any particular method. To cite an instance, after the salt solution containing rhodium and the salt-contained solution containing platinum are prepared, respectively, and the salt-contained solutions are impregnated in sequence into alumina and then are baked.

In this method, the salt solution illustrated above may be used for the salt-contained solution. In practice, aqueous nitrate solution, dinitrodiammine nitric acid solution, aqueous chloride salt solution and the like are used. To be more specific, rhodium salt solutions that may preferably be used include, for example, rhodium nitrate solution and rhodium chloride solution, and platinate solutions that may preferably be used include, for example, dinitrodiammine platinum nitrate solution, chloroplatinic solution and quadrivalent platinum ammine solution. Preferably, after the alumina is impregnated with rhodium and platinum, it is dried at about 50–200° C. for about 1–48 hours for each of the impregnations and further is baked at about 350–1,000° C. for about 1–12 hours. Another method may alternatively be taken that after a salt solution containing both of rhodium and platinum is prepared, the alumina is impregnated with the salt-contained solution at a time and then is baked.

A still another method of allowing rhodium and platinum to be supported on alumina may be adopted. To cite an instance, when alumina is precipitated from aqueous aluminum salt solution by using ammonia and the like in the producing process of the alumina, a solution of rhodium salt and a solution of platinum salt are added to cause the rhodium and platinum to be coprecipitated together with the alumina and then the coprecipitated product is oxidized.

In the exhaust gas purifying catalyst of the present invention, the rhodium and platinum are previously supported on the zirconium complex oxide as well, with both coexisting with each other. The support of rhodium and platinum on the zirconium complex oxide can allow the activity of rhodium to develop effectively.

The method of allowing rhodium and platinum to be supported on the zirconium complex oxide is not limited to any particular method. Any of the known methods may be used. To cite an instance, after salt solutions containing rhodium and salt solution containing platinum are prepared, respectively, the respective salt-contained solutions are impregnated in sequence into the zirconium complex oxide and then are baked, in the same manner as that mentioned above.

A yet another method of allowing rhodium and platinum to be supported on the zirconium complex oxide may be adopted. To cite an instance, when a salt solution containing zirconium, cerium and alkaline, earth metal and/or rare earth metal or a mixed alkoxide solution is coprecipitated or hydrolyzed in the producing process of the zirconium complex oxide, a solution of rhodium salt and a solution of platinum salt are added to cause the rhodium and platinum to be coprecipitated together with the components of the zirconium complex oxide and then the coprecipitated product is oxidized.

In the exhaust gas purifying catalyst of the present invention, the platinum is previously supported on the cerium complex oxide without the rhodium being supported thereon. The support of platinum on the cerium complex oxide without the rhodium supported thereon can allow the oxide storage capacity to develop effectively, with a reduced quantity of rhodium to be used.

The method of allowing platinum to be supported on the cerium complex oxide is not limited to any particular method. Any of the known methods may be used. To cite an instance, after a salt solution containing platinum is prepared, the cerium complex oxide is impregnated with the salt-contained solution and then is baked, in the same manner as that mentioned above. A yet another method of allowing platinum to be supported on the cerium complex oxide may be adopted. To cite an instance, when a salt solution containing cerium, zirconium and alkaline earth metal and/or rare earth metal or a mixed alkoxide solution is coprecipitated or hydrolyzed in the producing process of the cerium complex oxide, a solution of platinum salt is added to cause the platinum to be coprecipitated together with the components of the cerium complex oxide and then the coprecipitated product is oxidized.

In the exhaust gas purifying catalyst of the present invention, the alumina thus produced on which rhodium and platinum are previously supported, the zirconium complex oxide thus produced on which rhodium and platinum are previously supported and the cerium complex oxide thus produced on which platinum is previously supported are mixed. The mixture of the alumina, the zirconium complex oxide and the cerium complex oxide may be formed by any known method, such as the method in which those are formed into slurry after mixed or the method in which those are mixed after formed into the slurry.

In addition to the three components cited above, alumina on which no noble metal, such as rhodium, platinum and palladium, is supported and cerium complex oxide on which no noble metal, such as rhodium, platinum and palladium, is supported may be mixed in this mixture for improved heat resistance, depending on the intended purposes and applications. As for the zirconium complex oxide, the zirconium complex oxide on which noble metal is supported, in other words, only the zirconium complex oxide on which rhodium and platinum are previously supported mentioned above is preferably mixed therein.

These may be mixed, for example when alumina, zirconium complex oxide and cerium complex oxide are formed into slurry by adding water thereto. Alternatively, after a simple slurry of alumina and/or cerium complex oxide on which those noble metals are not supported is prepared, the slurry thus prepared may be mixed in the slurry containing alumina, zirconium complex oxide and cerium complex oxide.

The exhaust gas purifying catalyst of the present invention thus obtained is preferably presented in the form of a coating layer formed on a catalyst carrier. The catalyst carriers used are not limited to any particular catalyst carrier. For example, a known catalyst carrier, such as a honeycomb monolithic carrier formed of cordierite and the like, may be used. The exhaust gas purifying catalyst can be presented in the form of a coating layer formed on the catalyst carrier, for example, by the following ways. To cite one example, the alumina, the zirconium complex oxide and the cerium complex oxide are formed into slurries, respectively, by adding water to each of them, first, and then those slurries are mixed. Then, the mixed slurries are coated on the catalyst carriers. After having dried at about 50–200°C. for about 1–48 hours, they are baked at about 350–1,000°C. for about 1–12 hours. To cite another example, after powders of the alumina, zirconium complex oxide and cerium complex oxide are mixed, they are formed into a slurry by adding water thereto. Then, the slurry is coated on the catalyst carriers. After having dried at about 50–200°C. for about 1–48 hours, they may be baked further at about 350–1,000°C. for about 1–12 hours.

In the exhaust gas purifying catalyst of the present invention thus obtained, the alumina is preferably in the proportion of 50–150 g, or further preferably 80–120 g, the zirconium complex oxide is preferably in the proportion of 20–100 g, or further preferably 40–60 g, and the cerium complex oxide is preferably in the proportion of 40–150 g, or further preferably 80–120 g, per liter of catalyst carrier. Also, the quantity of rhodium supported is preferably less than 1 g, further preferably not more than 0.8 g, or particularly in the range of 0.2–0.5 g, per liter of catalyst carrier. The quantity of platinum supported is preferably in the range of 0.5–2 g, or further preferably 0.7–1.5 g, per liter of catalyst carrier.

It should be noted that in the exhaust gas purifying catalyst of the present invention, rhodium is completely supported on alumina and zirconium complex oxide, while platinum is completely supported on alumina, zirconium complex oxide and cerium complex oxide. For this, the rhodium is preferably supported on the alumina and zirconium complex oxide in such a proportion that a quantity of rhodium supported on the zirconium complex oxide is in the range of 0.1–10 parts by weight, or preferably 0.5–2 parts by weight, per part by weight of rhodium supported on the alumina. Also, the platinum is preferably supported on the alumina, zirconium complex oxide and cerium complex oxide in such a proportion that a quantity of platinum supported on the zirconium complex oxide is in the range of 0.1–10 parts by weight, or preferably 0.3–1 parts by weight, and a quantity of platinum supported on the cerium complex oxide is in the range of 0.1–10 parts by weight, or preferably 0.5–2 parts by weight, per part by weight of platinum supported on the alumina.

The exhaust gas purifying catalyst of the present invention may be presented in the form of a multilayered (at least two layers) coating layer on the catalyst carrier, as well as in the form of single coating layer coated on the catalyst carrier. Also, the exhaust gas purifying catalyst of the present invention is preferably presented in the form of an outermost layer, when presented in the form of a multilayer coated on the catalyst carrier. In this case, the slurries containing components of their respective layers may be coated on the catalyst carrier one after another and then dried and baked for each layer in sequence.

When the exhaust gas purifying catalyst of the present invention is presented in the form of a multilayer coated on the catalyst carrier, the alumina supporting palladium is preferably contained in an inner coating layer or in at least one coating layer except the outermost layer. Although palladium itself has somewhat poor heat resistance and is susceptible to poisoning, since the palladium contained in the inner coating layer in this manner is protected by an outer coating layer, its durability can be enhanced. Besides, when the palladium is contained in the inner coating layer in this manner, the palladium is contained in an inner coating layer different than the rhodium-contained outermost layer while the rhodium is not contained in the palladium-contained inner coating layer. This can effectively prevent making an alloy of rhodium and palladium, thus providing improved heat resistance.

It should be noted that any particular limitation is imposed on the inner coating layer for the alumina supporting palladium to be contained in. The alumina supporting palladium may be contained in any inner coating layer, as long as it belongs to any of the inner coating layers.

To be more specific, for example, in the case of a two layer, the exhaust gas purifying catalyst of the present invention is presented in the form of a second layer (an outermost layer:an upper layer) formed on a first layer (an inner layer:a lower layer) directly coated on the catalyst carrier. In this case, it is preferable that a total amount of alumina, zirconium complex oxide and cerium complex oxide contained in the first and second layers falls within the range mentioned above.

Preferably used as the component of the first layer is, for example, at least one component selected from alumina, zirconium complex oxide and cerium complex oxide. For instance, alumina in the range of 20–100 g and cerium complex oxide in the range of 20–70g per liter of catalyst carrier are preferably used. In addition, noble metals such as rhodium, platinum and palladium may also be supported on the lower layer. The quantity of each of the noble metals supported is preferably in the range of 0.4–5g per liter of catalyst carrier. Palladium is preferably supported on alumina.

For supporting palladium, it is preferable that the layer on which palladium is supported further comprises sulfate, carbonate, nitrate and/or acetate of Ba, Ca, Sc, Mg and La. When these sulfate, carbonate, nitrate and/or acetate are contained in that layer, the catalyst is prevented from being poisoned, for example, by hydrocarbon (HC) of palladium, so that the catalytic activity is prevented from being deteriorated. The proportion in which the sulfate, carbonate, nitrate and/or acetate are contained is properly selected, depending on the intended purposes and applications. The layers containing the sulfate, carbonate, nitrate and/or acetate may be formed, for example, by mixing sulfate, carbonate, nitrate and/or acetate in the slurries used for forming the respective layers.

The exhaust gas purifying catalyst of the present invention thus obtained exhibits an excellent activity for both oxidation and reduction and provides a particularly excellent low-temperature activity, and it also requires only a small quantity of rhodium supported for developing its excellent effect in purification of NOx, and also produces an excellent purifying performance economically even in endurance running at high temperature. Accordingly, the exhaust gas purifying catalyst of the present invention is suitably applicable to turbocharged engines, light load automotive vehicles and the like.

EXAMPLES

In the following, the present invention will be described further specifically with reference to Examples and Comparative Examples. The present invention is not in any manner limited to the illustrated Examples and Comparative Examples.

Preparation of Cerium Complex Oxide A 0.1 mol of cerium methoxypropylate, 0.09 mol of zirconium methoxypropylate and 0.01 mol of yttrium methoxypropylate were added to 200 ml of toluene and stirred for dissolution, whereby a mixed alkoxide solution was prepared. Then, 80 ml of deionized water was dropped into the mixed alkoxide solution to hydrolyze the alkoxide. Then, the toluene and the deionized water were distilled off from the hydrolyzed solution and evaporated for dryness to produce the precursor of $Ce_{0.50}Zr_{0.45}Y_{0.05}O_{1.97}$. This was dried through circulation drying at 60° C. for 24 hours and then was baked at 450° C. for 3 hours in an electric furnace, to thereby produce powder of cerium complex oxide A having the composition of $Ce_{0.50}Zr_{0.45}Y_{0.05}O_{1.97}$.

Preparation of Zirconium Complex Oxide B

In accordance with the same method as in the preparation of cerium complex oxide A, powder of zirconium complex oxide B having the following composition was produced.

Zirconium complex oxide B: $Zr_{0.78}Ce_{0.16}La_{0.02}Nd_{0.04}O_{1.97}$

Example 1

Formation of Lower Layer:

First, powder of $Al_2O_3$ was impregnated with palladium nitrate solution. After having been dried, this was baked at 600° C. for 3 hours in the electric furnace to thereby prepare powder of Pd supported $Al_2O_3$. Then, the powder of Pd supported $Al_2O_3$ and the powder of cerium complex oxide A were mixed and pulverized in a ball mill, and distilled water was added thereto to prepare the slurry. The slurry was applied to inner surfaces of cells of monolithic carrier (105.7 mm in diameter, 114 mm in length, and 1,000 mL in capacity, the same applies to the following) to coat the inner surfaces of the cells with the slurry. After having been dried, they were baked at 600° C. for 3 hours to thereby form the lower layers. It should be noted that the lower layers were formed to establish the proportion of 50 g of powder of Pd supported $Al_2O_3$ (a quantity of Pd supported of 0.5 g) and 20 g of powder of cerium complex oxide A per liter of monolithic carrier.

Formation of Upper Layer:

First, the powder of $Al_2O_3$ was impregnated with dinitrodiammine platinum nitrate solution. After having been dried, this was baked at 600° C. for 3 hours in the electric furnace, so that the platinum was supported on the powder of $Al_2O_3$. Further, the powder of Pt supported $Al_2O_3$ was impregnated with rhodium nitrate solution. Then, after having been dried, this was baked at 600° C. for 3 hours in the electric furnace to prepare the powder of Pt—Rh supported $Al_2O_3$.

Then, the powder of zirconium complex oxide B was impregnated with dinitrodiammine platinum nitrate solution. After having been dried, this was baked at 600° C. for 3 hours in the electric furnace, so that platinum was supported on the powder of zirconium complex oxide B. Further, the powder of Pt supported zirconium complex oxide B was impregnated with rhodium nitrate solution. Then, after having been dried, this was baked at 600° C. for 3 hours in the electric furnace to prepare the powder of Pt—Rh supported zirconium complex oxide B.

Further, the powder of cerium complex oxide A was impregnated with dinitrodiammine platinum nitrate solution. After having been dried, this was baked at 600° C. for 3 hours in the electric furnace to thereby prepare powder of Pt supported cerium complex oxide A.

Then, the powder of Pt—Rh supported $Al_2O_3$, the powder of Pt—Rh supported zirconium complex oxide B and the powder of Pt supported cerium complex oxide A were mixed and pulverized in the ball mill, and distilled water was added thereto to prepare the slurry. The slurry was applied to inner surfaces of cells of the monolithic carriers on which the lower layers were already formed, to coat the inner surfaces of the cells with the slurry. After having been dried, they were baked at 600° C. for 3 hours to form upper layers, whereby a two-layer exhaust gas purifying catalyst was produced.

It should be noted that the upper layers were formed to establish the proportion of 70 g of powder of Pt—Rh supported $Al_2O_3$ (a quantity of Pt supported of 0.2 g, a quantity of Rh supported of 0.2 g), 35 g of powder of Pt—Rh supported zirconium complex oxide B (a quantity of Pt supported of 0.1 g, a quantity of Rh supported of 0.2 g), 75 g of Pt supported cerium complex oxide A (a quantity of Pt supported of 0.2 g), per liter of monolithic carriers.

Comparative Example 1

Formation of Lower Layer

First, the powder of $Al_2O_3$ and the powder of cerium complex oxide A were mixed and pulverized in a ball mill, and distilled water was added thereto to prepare the slurry. The slurry was applied to inner surfaces of cells of monolithic carriers to coat the inner surfaces of the cells with the slurry. After having been dried, they were baked at 600° C. for 3 hours. Then, the monolithic carriers forming those coating layers thereon were immersed into platinum nitrate solution, so as to be impregnated with it. After having been dried, they were baked 600° C. for 3 hours to thereby form the lower layers with Pd supported on the whole coating layers. It should be noted that the lower layers were formed to establish the proportion of 50 g of powder of Pd supported $Al_2O_3$ and 20 g of powder of Pd supported cerium complex oxide A (a quantity of Pt supported of 0.5 g of the total of the powder of $Al_2O_3$ and the powder of cerium complex oxide A), per liter of monolithic carrier.

Formation of Upper Layer:

First, the powder of cerium complex oxide A was impregnated with dinitrodiammine platinum nitrate solution. After having been dried, this was baked at 600° C. for 3 hours in the electric furnace, so that the platinum was supported on the powder of cerium complex oxide A. Further, the powder of Pt supported cerium complex oxide A was impregnated with rhodium nitrate solution. Then, after having been dried, this was baked at 600° C. for 3 hours in the electric furnace to prepare the powder of Pt—Rh supported cerium complex oxide A.

Then, the powder of Pt—Rh supported cerium complex oxide A, the powder of zirconium complex oxide B and the powder of $Al_2O_3$ were mixed and pulverized in the ball mill, and distilled water was added thereto to prepare the slurry. The slurry was applied to inner surfaces of cells of the monolithic carriers on which the lower layers were already formed, to coat the inner surfaces of the cells with the slurry. After having been dried, they were baked at 600° C. for 3 hours to form upper layers, whereby a two-layer exhaust gas purifying catalyst was produced.

It should be noted that the upper layers were formed to establish the proportion of 75 g of powder of Pt—Rh supported cerium complex oxide A (a quantity of Pt supported of 0.5 g, a quantity of Rh supported of 0.4 g), 35 g of powder of zirconium complex oxide B and 70 g of $Al_2O_3$, per liter of monolithic carriers.

Thus, in Comparative Example 1, the exhaust gas purifying catalyst was formed in the proportion of 0.5 g of quantity of Pd supported on the lower layer, 0.5 g of quantity of Pt supported on the upper layer and 0.4 g of quantity of Rh supported on the upper layer, per liter of monolithic carriers, which was identical in the proportion of quantity of noble metal supported to Example 1.

Example 2

First, the powder of $Al_2O_3$ was impregnated with dinitrodiammine platinum nitrate solution. After having been dried, this was baked at 600° C. for 3 hours in the electric furnace, so that the platinum was supported on the powder of $Al_2O_3$. Further, the powder of Pt supported $Al_2O_3$ was impregnated with rhodium nitrate solution. Then, after having been dried, this was baked at 600° C. for 3 hours in the electric furnace to prepare the powder of Pt—Rh supported $Al_2O_3$.

Then, the powder of zirconium complex oxide B was impregnated with dinitrodiammine platinum nitrate solution. After having been dried, this was baked at 600° C. for 3 hours in the electric furnace, so that platinum was supported on the powder of zirconium complex oxide B. Further, the powder of Pt supported zirconium complex oxide B was impregnated with rhodium nitrate solution. Then, after having been dried, this was baked at 600° C. for 3 hours in the electric furnace to prepare the powder of Pt—Rh supported zirconium complex oxide B.

Further, the powder of cerium complex oxide A was impregnated with dinitrodiammine platinum nitrate solution. After having been dried, this was baked at 600° C. for 3 hours in the electric furnace to thereby prepare powder of Pt supported cerium complex oxide A.

Then, the powder of Pt—Rh supported $Al_2O_3$, the powder of Pt—Rh supported zirconium complex oxide B and the powder of Pt supported cerium complex oxide A were mixed and pulverized in the ball mill, and distilled water was added thereto to prepare the slurry. The slurry was applied to inner surfaces of cells of the monolithic carriers, to coat the inner surfaces of the cells with the slurry. After having been dried, they were baked at 600° C. for 3 hours, whereby an exhaust gas purifying catalyst was produced.

It should be noted that the exhaust gas purifying catalyst was formed to establish the proportion of 115 g of powder of Pt—Rh supported $Al_2O_3$ (a quantity of Pt supported of 0.4 g, a quantity of Rh supported of 0.1 g), 45 g of powder of Pt—Rh supported zirconium complex oxide B (a quantity of Pt supported of 0.2 g, a quantity of Rh supported of 0.1 g), 80 g of Pt supported cerium complex oxide A (a quantity of Pt supported of 0.4 g), per liter of monolithic carriers.

Example 3

Except that the exhaust gas purifying catalyst was formed to establish the proportion of 115 g of powder of Pt—Rh supported $Al_2O_3$ (a quantity of Pt supported of 0.2 g, a quantity of Rt supported of 0.2 g), 45 g of powder of Pt—Rh supported zirconium complex oxide B (a quantity of Pt supported of 0.2 g, a quantity of Rh supported of 0.2 g), 80 g of Pt supported cerium complex oxide A (a quantity of Pt supported of 0.4 g), per liter of monolithic carriers, the same operation was performed as in Example 2 to thereby produce the exhaust gas purifying catalyst.

Comparative Example 2

First, the powder of cerium complex oxide A was impregnated with dinitrodiammine platinum nitrate solution. After having been dried, this was baked at 600° C. for 3 hours in the electric furnace to prepare powder of Pt supported cerium complex oxide A. Then, the powder of Pt supported cerium complex oxide A, the powder of zirconium complex oxide B and the powder of $Al_2O_3$ were mixed and pulverized in the ball mill, and distilled water was added thereto to prepare the slurry. The slurry was applied to inner surfaces of cells of the monolithic carriers, to coat the inner surfaces of the cells with the slurry. After having been dried, they were baked at 600° C. for 3 hours.

Sequentially, the monolithic carriers forming the coat layers thereon were immersed into rhodium nitrate solution, so as to be impregnated with it. After having been dried, they were baked 600° C. for 3 hours to thereby form the surface coat comprising rhodium on the coating layers.

It should be noted that this exhaust gas purifying catalyst was formed to establish the proportion of 80 g of powder of Pt supported cerium complex oxide A (a quantity of Pt supported of 0.8 g), 45 g of powder of zirconium complex oxide B and 115 g of powder of $Al_2O_3$, per liter of monolithic carrier, and also establish the proportion of 0.4 g of quantity of rhodium on the surface coat per liter of monolithic carrier.

Thus, in Comparative Example 2, the exhaust gas purifying catalyst was formed in the proportion of 0.8 g of quantity of Pt supported and 0.4 g of quantity of Rh supported, per liter of monolithic carriers, which was identical in the proportion of quantity of noble metal supported to Example 3.

1,050° C. Endurance Test:

A V type eight cylinder engine of 4,000 cc was loaded on a real automobile and the exhaust gas purifying catalysts of Examples and Comparative Examples were connected to a bank of the engine (4 cylinders). With the cycle shown in FIG. 1 as a single cycle (30 seconds), the cycle was repeated for 50 hours for the endurance test of the exhaust gas purifying catalysts of Examples and Comparative Examples.

One cycle was set as shown in FIG. 1. Specifically, for 0–5 seconds, a mixed gas of gasoline and air which was kept in the stoichimetric state of amount of theoretical combustion air (A/F=14.6) under feedback control was fed to the engine and the internal temperature of the exhaust gas purifying catalysts (catalyst bed) was set to be around 850° C. For 5–7 seconds, the feedback was allowed to open and the fuel was injected excessively, so that the fuel-rich mixed gas (A/F=11.2) was fed to the engine. For 7–28 seconds, while an excessive amount of fuel was kept on being fed to the engine with the feedback open, secondary air was introduced from the outside of the engine through an inlet tube upstream of the catalytic parts, to allow the excessive fuel to react with the secondary air in the interior of the catalyst bed, so as to raise the temperature of catalyst bed. In this time period, the highest temperature was 1,050° C. and the A/F was substantially kept at the amount of theoretical combustion air of 14.8. For the last time period of 28–30 seconds, no fuel was fed but the secondary air was fed to the engine to put the engine into a lean state. The fuel was fed in the condition in which phosphorus compound was added to the gasoline. The total amount was set at 0.41 g in the endurance test by converting the amount of addition to the element of phosphorous. The temperature of the catalyst bed was measured by thermocouple inserted into a center part of the honeycomb carrier.

Measurement of CO—NOx Cross-Point Purifying Rate and 50% Purifying Window

The catalytic parts of the catalysts subjected to the endurance test mentioned above were annealed at 900° C. for 2 hours. Sequentially, the mixed gas was fed to the engine, while it was varied from its fuel-rich state to its lean state. The exhaust gas produced by the combustion in the engine was purified by use of the exhaust gas purifying catalysts of Examples and Comparative Examples. The CO and NOx purifying rates were measured. A purifying rate obtained when the purifying rates of these components were coincident with each other was defined as a CO—NOx cross-point purifying rate, and the range within which all the purifying rates of CO, NOx and HC are 50% or more was defined as a 50% purifying window. It is to be noted that the measurement of the purifying rates was performed in the condition of the engine only, rather than in the condition in which the engine was mounted on the real automobile. The temperature of the exhaust gas fed to the parts of the catalysts was set at 460° C. and space velocity SV was set at 180,000/h. The results are shown in TABLE 1. The maximum purifying rate of NOx measured in that measurement is also included in TABLE 1.

Measurement of 50% Purifying Temperature

A mixed gas of gasoline and air which was kept in the stoichiometric state (A/F=14.6±0.25) was fed to the engine. While the temperature of the exhaust gas exhausted by the combustion of the mixed gas was raised at the rate of 30° C./min., the exhaust gas was fed to the parts of catalysts of the exhaust gas purifying catalysts of Examples and Comparative Examples. The temperature when 50% of HC in the exhaust gas was purified and the temperature when 50% of CO in the exhaust gas was purified were both measured. The measurement of the purifying rates was performed in the condition of the engine only, rather than in the condition in which the engine was mounted on the real automobile. The temperature of the exhaust gas fed to the parts of the catalysts was set at 460° C. and space velocity SV was set at 180,000/h. The results are shown in TABLE 1.

The invention claimed is:

1. An exhaust gas purifying catalyst comprising: an alumina on which rhodium and platinum are previously supported; a zirconium complex oxide on which rhodium and platinum are previously supported, and a cerium complex oxide on which platinum is previously supported.

2. The exhaust gas purifying catalyst according to claim 1, wherein the zirconium complex oxide comprises zirconium and cerium in a proportion of a zirconium content being more than a cerium content; and wherein the cerium complex oxide comprises cerium and zirconium in a proportion of a cerium content being more than a zirconium content.

3. The exhaust gas purifying catalyst according to claim 1 wherein the zirconium complex oxide is a heat-resisting oxide expressed by the following general formula (1):

$$Zr_{1-(a+b)}Ce_aN_bO_{2-c} \tag{1}$$

(In the formula, N represents alkaline earth metal or rare earth metal, c represents oxygen vacancy, a represents a proportion of atom of 0.10–0.35, b represents a proportion of atom of 0–0.20, and 1−(a+b) represents a proportion of atom of 0.45–0.90), and wherein the cerium complex oxide is a heat-resisting oxide expressed by the following general formula (2):

$$Ce_{1-(x+y)}Zr_xM_yO_{2-z} \tag{2}$$

(In the formula, M represents alkaline earth metal or rare earth metal, z represents oxygen vacancy, x represents a proportion of atom of 0.20–0.70, y represents a

TABLE 1

| | Noble metal (g/L-cat) | Upper layer (g/L-cat) | | | Lower layer (g/L-cat) | | CO—NOx Cross-point Purifying Rate (%) | NOx Maximum Purifying Rate (%) | 50% Purofying Window (A/F) | 50% Purifying Temperature (° C.) | |
|---|---|---|---|---|---|---|---|---|---|---|---|
| | Pt/Rh/Pd | Al₂O₃ | Zr Complex Oxide | Ce Complex Oxide | Al₂O₃ | Ce Complex Oxide | | | | HC | CO |
| Example 1 | 0.5/0.4/0.5 | Pt/Rh 0.2/0.2 | Pt/Rh 0.1/0.2 | Pt 0.2 | Pd 0.5 | | 73 | 92 | 0.2 | 409 | 410 |
| Compara. Example 1 | 0.5/0.4/0.5 | | | Pt/Rh 0.5/0.4 | Total Pd = 0.5 | | 59 | 70 | 0.13 | 429 | 431 |
| Example 2 | 1.0/0.2/0 | Pt/Rh 0.4/0.1 | Pt/Rh 0.2/0.1 | Pt 0.4 | | | 73 | 79 | 0.28 | 408 | 409 |
| Example 3 | 0.8/0.4/0 | Pt/Rh 0.2/0.2 | Pt/Rh 0.2/0.2 | Pt 0.4 | | | 75 | 89 | 0.28 | 403 | 398 |
| Compara. Example 2 | 0.8/0.4/0 | Surface Coat Rh = 0.4 | | Pt 0.8 | | | 57 | 67 | 0.13 | 436 | 442 |

While the illustrative examples of the present invention are provided in the above description, such is for illustrative purpose only and it is not to be construed restrictively. Modification and variation of the present invention that will be obvious to those skilled in the art is to be covered in the following claims.

INDUSTRIAL APPLICABILITY

As mentioned above, the exhaust gas purifying catalyst of the present invention can be suitably used as an exhaust gas purifying catalyst for effectively purifying carbon monoxides (CO), hydrocarbons (HC) and nitrogen oxides (NOx) contained in exhaust gas from an automotive engine and the like.

proportion of atom of 0–0.20, and 1−(x+y) represents a proportion of atom of 0.10–0.80).

4. The exhaust gas purifying catalyst according to claim 1, which is presented in a form of an outermost layer of multi-coating layers formed on a catalyst carrier.

5. The exhaust gas purifying catalyst according to claim 4, wherein alumina on which palladium is supported is contained in at least one layer of the multi-coating layers, except the outermost layer.

6. The exhaust gas purifying catalyst according to claim 5, wherein rhodium is not contained in a layer containing alumina on which palladium is supported.

* * * * *